(12) United States Patent
Morio et al.

(10) Patent No.: US 10,596,895 B2
(45) Date of Patent: Mar. 24, 2020

(54) TORQUE VECTORING DEVICE

(71) Applicant: AISIN SEIKI KABUSHIKI KAISHA, Kariya-shi (JP)

(72) Inventors: Toshiyuki Morio, Chita-gun (JP); Keisuke Mishima, Takahama (JP); Toshihiko Yamanaka, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 39 days.

(21) Appl. No.: 15/745,833

(22) PCT Filed: Aug. 30, 2016

(86) PCT No.: PCT/JP2016/075371
§ 371 (c)(1),
(2) Date: Jan. 18, 2018

(87) PCT Pub. No.: WO2017/043377
PCT Pub. Date: Mar. 16, 2017

(65) Prior Publication Data
US 2018/0208048 A1   Jul. 26, 2018

(30) Foreign Application Priority Data
Sep. 9, 2015  (JP) .................................. 2015-177571

(51) Int. Cl.
*F16H 48/11*  (2012.01)
*B60K 7/00*  (2006.01)
(Continued)

(52) U.S. Cl.
CPC .............. *B60K 7/0007* (2013.01); *B60K 1/02* (2013.01); *B60K 17/046* (2013.01); *F16H 48/11* (2013.01);
(Continued)

(58) Field of Classification Search
CPC .. B60K 1/02; B60K 7/0007; B60K 2001/001; B60K 17/046; F16H 48/36; F16H 48/11; B60Y 2300/82; B60Y 2400/804
See application file for complete search history.

(56) References Cited

U.S. PATENT DOCUMENTS 5,387,161 A * 2/1995 Shibahata ............... F16H 48/08
475/150
2012/0015772 A1   1/2012 Kira et al.
(Continued)

FOREIGN PATENT DOCUMENTS

JP          04-321435 A     11/1992
WO    WO 2014/008896 A1     1/2014

OTHER PUBLICATIONS

Extended European Search Report dated Aug. 10, 2018 in Patent Application No. 16844238.2, 6 pages.
(Continued)

*Primary Examiner* — Mark J Beauchaine
(74) *Attorney, Agent, or Firm* — Oblon, McClelland, Maier & Neustadt, L.L.P.

(57) ABSTRACT

The torque vectoring device includes a torque vectoring motor, a first sun gear connected to the left drive wheel, a plurality of first planetary gears, a second sun gear, a plurality of second planetary gear formed integrally and coaxially with the first planetary gear, a common carrier to which the torque vectoring motor is connected and which pivotally supports the first and the second planetary gears, a differential ring gear to which the drive torque is inputted, a differential sun gear which is connected to the left drive wheel and a differential carrier which is connected to the second sun gear and at the same time connected to the right drive wheel.

2 Claims, 4 Drawing Sheets

(51) Int. Cl.
    *B60K 1/02*         (2006.01)
    *B60K 17/04*       (2006.01)
    *F16H 48/36*      (2012.01)
    *B60K 1/00*         (2006.01)

(52) U.S. Cl.
    CPC ........ *F16H 48/36* (2013.01); *B60K 2001/001* (2013.01); *B60Y 2300/82* (2013.01); *B60Y 2400/804* (2013.01)

(56) References Cited

U.S. PATENT DOCUMENTS

| | | |
|---|---|---|
| 2014/0080649 A1 | 3/2014 | Kira et al. |
| 2014/0080665 A1 | 3/2014 | Kira et al. |
| 2014/0256490 A1* | 9/2014 | Honda .................... B60K 6/52 |
| | | 475/5 |
| 2015/0176687 A1 | 6/2015 | Smetana et al. |

OTHER PUBLICATIONS

International Search Report dated Dec. 6, 2016, in PCT/JP2016/075371 filed Aug. 30, 2016.
Sawase, Kaoru et al., "Improvement of Vehicle Dynamics by Right-and-Left Torque Vectoring system in Various Drivetrains", Mitsubishi Motors Technical Review, vol. 20, (2008), pp. 14-20.
Chinese Office Action dated Oct. 31, 2019 for Chinese Application No. 201680045864.2 and English translation of relevant portions thereof.

* cited by examiner

TORQUE VECTORING DEVICE

TECHNICAL FIELD

This invention relates to a torque vectoring device.

BACKGROUND ART

Conventionally, as shown in Patent Literature 1, a torque vectoring device has been proposed in which the turning performance of a vehicle can be improved by distributing drive torque outputted to the right and left drive wheels from the drive source by a motor torque which is outputted by a torque vectoring motor. This type of torque vectoring device is formed by a first planetary gear mechanism which serves as a differential mechanism, a second planetary gear mechanism which serves as a torque distributing mechanism, a third planetary gear mechanism and a torque vectoring motor.

CITATION LIST

Patent Literature

Patent Literature 1: WO2014-008896 A

SUMMARY OF INVENTION

Technical Problem(s)

When the vehicle is travelling straight forward, the torque vectoring motor is controlled so that the drive torques outputted to respective right and left drive wheels from the drive source become equal to each other. According to the torque vectoring device shown in the Patent Literature 1, the torque vectoring motor does not rotate when the vehicle is travelling straight forward. Therefore, the electric current flows through only a particular phase stator among a plurality of stators of the torque vectoring motor, which may lead to an overheating of the particular phase stator. Thus, the particular phase stator of the motor may be deteriorated due to such overheating.

Accordingly, this invention was made in consideration with the above-mentioned situation and the objective of the invention is to provide a torque vectoring device which can prevent deterioration of the stator of the torque vectoring motor by rotating the torque vectoring motor even under a situation that the vehicle is travelling straight forward.

Solution to Problem(s)

In order to solve the above conventional problems, the torque vectoring device associated with one aspect of the invention includes a torque vectoring motor, a first sun gear, a plurality of first planetary gears provided at an outer peripheral side of the first sun gear and engaged therewith, a second sun gear which gear diameter is larger than a gear diameter of the first sun gear, a plurality of second planetary gears provided at an outer peripheral side of the second sun gear and engaged therewith, the plurality of second planetary gears being arranged coaxial with the plurality of first planetary gears and formed integrally therewith, a common carrier connected to the torque vectoring motor and pivotally supporting the plurality of first planetary gears and the plurality of second planetary gears, a differential which includes an input member to which a drive torque is inputted, a first output member connected to the first sun gear and at the same time connected to one of a right drive wheel and a left drive wheel, and a second output member connected to the second sun gear and at the same time connected to the other of the right drive wheel and the left drive wheel, wherein the differential absorbs a rotational speed difference between the right drive wheel and the left drive wheel.

By structuring the torque vectoring device as explained above, the torque vectoring motor can rotate even under a state that the vehicle is travelling straight forward. Therefore, the torque vectoring motor is not rotatable when the torque vectoring motor is controlled so that the drive torques outputted to the right and left drive wheels from the drive source become equal to each other under the state that the vehicle is travelling straight forward. Thus, flowing of the current only through the particular phase stator among the plurality of stators of the torque vectoring motor can be prevented to thereby prevent the particular phase stator from deterioration.

BRIEF EXPLANATION OF ATTACHED DRAWINGS

EMBODIMENTS FOR IMPLEMENTING INVENTION (Vehicle Drive Device)

Figure 1:
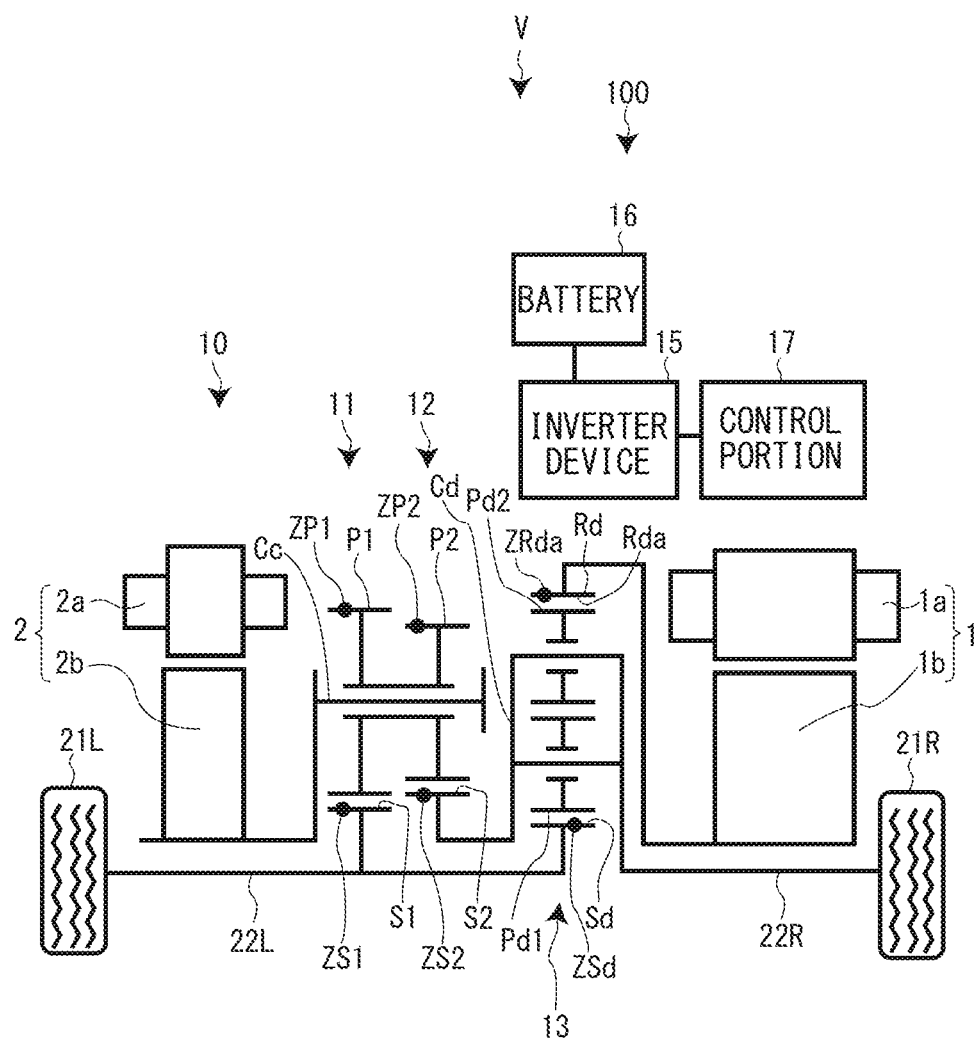
FIG. 1 is an explanatory schematic view of the drive device for a vehicle in which the torque vectoring device according to a first embodiment is installed.

The vehicle drive device 100 for vehicle V in which the torque vectoring device 10 according to the first embodiment (hereinafter, referred to as "torque vectoring device 10", case by case) is installed will be explained with reference to FIG. 1 of the attached drawings. The vehicle drive device 100 is provided with a drive motor generator 1, the torque vectoring device 10, an inverter device 15, a battery 16 and a control portion 17. The vehicle V includes a left drive wheel 21L, a right drive wheel 21R, a left drive axle 22L and a right drive axle 22R.

The drive motor generator 1 outputs a motor torque Tm (drive torque) which drives the vehicle V. The drive motor generator 1 is formed by a stator 1$a$ which is fixed to the vehicle V and a rotor 1$b$ which is rotatably provided at an inner peripheral side of the stator 1$a$. The drive motor generator 1 functions as both a motor which generates a drive force by a supplied electric power and a generator which generates electricity by converting the kinetic energy into the electric energy.

The battery 16 is a secondary battery which stores electricity and supplies the stator 1$a$ of the drive motor generator 1 and a torque vectoring stator 2$a$ of a later explained torque vectoring motor 2 with the electricity through the inverter device 15. The inverter device 15 raises the electric voltage of the electricity supplied from the battery 16 and supplies the stator 1$a$ of the drive motor generator 1 and the torque vectoring stator 2$a$ of the torque vectoring motor 2 with the electricity with the raised electric voltage based on the instructions from the control portion 17 and further the inverter device 15 drops the electric voltage of the electricity generated at the drive motor generator 1 and the torque vectoring motor 2 and charges the battery 16 based on the instructions from the control portion 17.

(Torque Vectoring Device)

The torque vectoring device 10 distributes the motor torque Tm (drive torque) outputted from the drive motor generator 1 variably to the right and the left drive wheels 21R and 21L and at the same time absorbs the rotational speed difference between the right and the left drive wheels 21R and 21L. The torque vectoring device 10 is formed by a first planetary gear mechanism 11, a second planetary gear mechanism 12, a differential (differential device) 13 and the torque vectoring motor 2. The first planetary gear mechanism 11, the second planetary gear mechanism 12 and the differential 13 are in series arranged in coaxial with one another in an axial line direction.

The torque vectoring motor 2 is used for variably distributing the motor torque Tm (drive torque) outputted from the drive motor generator 1 to the right and the left drive wheels 21R and 21L. The torque vectoring motor 2 is formed by the torque vectoring stator 2a which is fixed to the vehicle V and the torque vectoring rotor 2b which is provided at an inner peripheral side of the torque vectoring stator 2a and is rotatable relative thereto. The torque vectoring motor 2 functions as both a motor which generates a drive force by a supplied electric power and a generator which generates electricity by converting the kinetic energy into the electric energy.

The first planetary gear mechanism 11 is formed by a first sun gear S1, a later explained plurality of first planetary gears P1 and a common carrier Cc. The plurality of first planetary gears P1 is provided at the outer peripheral side of the first sun gear S1 and is engaged with the first sun gear S1. The common carrier Cc pivotally supports the plurality of first planetary gears P1.

The second planetary gear mechanism 12 is arranged adjacent to the first planetary gear mechanism 11. The second planetary gear mechanism 12 is formed by a second sun gear S2, a plurality of second planetary gears P2 and a common carrier Cc. The gear diameter (pitch circle diameter, reference circle diameter) of the second sun gear S2 is large than the gear diameter of the first sun gear S1. The plurality of second planetary gears P2 is provided at the outer peripheral side of the second sun gear S2 and is engaged with the second sun gear S2. The plurality of second planetary gears P2 is formed coaxially and integrally with the plurality of first planetary gears P1. The gear diameter of the plurality of second planetary gears P2 is smaller than the gear diameter of the plurality of first planetary gears P1. The common carrier Cc pivotally supports the plurality of second planetary gears P2. As explained, the common carrier Cc pivotally supports the plurality of first planetary gears P1 and the plurality of second planetary gears P2. The torque vectoring rotor 2b of the torque vectoring motor 2 is connected to the common carrier Cc.

The differential 13 absorbs the rotational speed difference generated between the right and the left drive wheels 21R and 21L. The differential 13 is arranged adjacent to the second planetary gear mechanism 12 and is formed of a double pinion type planetary gear mechanism. The differential 13 is formed by a differential sun gear Sd, a first differential planetary gear Pd1, a second differential planetary gear Pd2, a differential carrier Cd and a differential ring gear Rd.

The differential sun gear Sd (corresponding to the first output member defined in appended claims of this application) and the first sun gear S1 are mutually connected to each other. Further, the differential sun gear Sd is connected to the left drive wheel 21L via the left drive axle 22L. The plurality of first differential planetary gears Pd1 is provided at the outer peripheral side of the differential sun gear Sd and is engaged with the differential sun gear Sd. The plurality of second differential planetary gears Pd2 is respectively provided at the outer peripheral side of the plurality of first differential planetary gears Pd1 and is engaged with the plurality of first differential planetary gears Pd1.

The differential carrier Cd (corresponding to the second output member defined in claims of the application) pivotally supports the plurality of first differential planetary gears Pd1 and the plurality of second differential planetary gears Pd2. The differential carrier Cd and the second sun gear S2 are mutually connected to each other. The differential carrier Cd is connected to the right drive wheel 21R via the right drive axle 22R.

The differential ring gear Rd (corresponding to the input member defined in claims of the application) is provided at the outer peripheral side of the plurality of second differential planetary gears Pd2 and the differential inner gear Rda is formed at the inner peripheral surface thereof which engages with the plurality of second differential planetary gears Pd2. The number of teeth ZRda of the differential inner gear Rda is twice as much as the number of the teeth ZSd of the differential sun gear Sd. The differential ring gear Rd is connected to the rotor 1b of the drive motor generator 1. By structuring above, the motor torque Tm (drive torque) is inputted to the differential ring gear Rd from the drive motor generator 1.

(Explanation of Speed Diagram of Torque Vectoring Device of First Embodiment)

Figure 2:
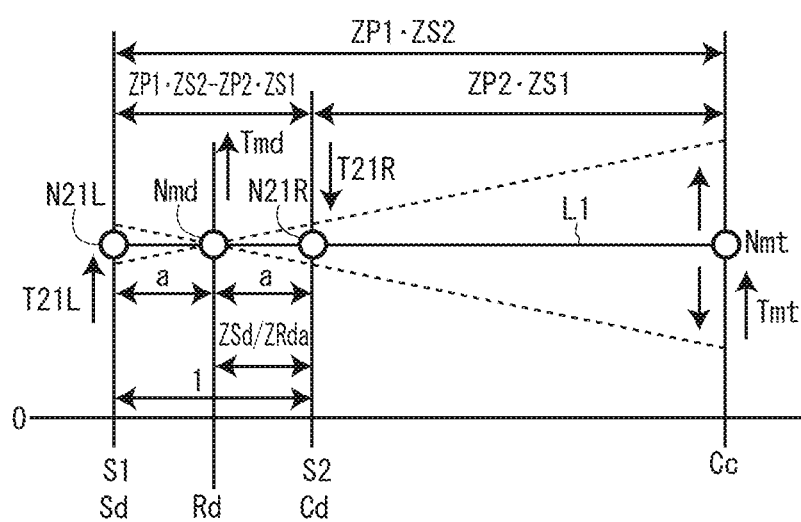
FIG. 2 is speed diagram of the torque vectoring device according to the embodiment of the invention.

The speed diagram of the torque vectoring device 10 according to the first embodiment will be explained with reference to FIG. 2. In FIG. 2, the vertical axis indicates respective rotational speed of the elements shown in FIG. 1. The area above the zero line in FIG. 2 indicates the positive rotation direction. The signs and/or symbols illustrated in FIG. 2 represent the following:

ZS1: number of teeth of first sun gear S1
ZS2: number of teeth of second sun gear S2
ZP1: number of teeth of first planetary gear P1
ZP2: number of teeth of second planetary gear P2
ZSd: number of teeth of differential sun gear Sd
ZRda: number of teeth of differential inner gear Rda
N21L: rotational speed of left drive wheel 21L
N21R: rotational speed of right drive wheel 21R
Nmd: rotational speed of drive motor generator 1
Nmt: rotational speed of torque vectoring motor 2
T21L: torque of left drive wheel 21L
T21R: torque of right drive wheel 21R
Tmd: torque of drive motor generator 1
Tmt: torque of torque vectoring motor 2

In FIG. 2, the straight line L1 represents the relationship of rotational speed of the first sun gear S1, the second sun gear S2 and the common carrier Cc and the relationship of rotational speed of the differential sun gear Sd, the differential ring gear Rd and the differential carrier Cd. In FIG. 2, the solid line represents the state that the vehicle V is travelling straight forward, and the broken lines represents the state that a rotational speed difference is generated between the right and left drive wheels 21R and 21L by the torque vectoring device 10.

The differential 13 is shown as a double pinion type and the number of teeth ZRda of the differential inner gear Rda is twice as much as the number of teeth ZSd of the differential sun gear Sd. Accordingly, in FIG. 2, the distance "a" between the vertical line which represents the rotational speed of the first sun gear S1 and the rotational speed of the differential sun gear Sd and the vertical line which represents the rotational speed of the differential gear Rd is set to be equal to the distance "a" between the vertical line which represents the rotational speed of the second sun gear S2 and the rotational speed of the differential carrier Cd and the vertical line which represents the rotational speed of the differential gear Rd.

As shown in FIG. 2, the torque vectoring motor 2 rotates even under the state that the vehicle V is travelling straight forward. If a motor torque difference between the right drive wheel 21R and the left drive wheel 21L is required, the control portion 17 gives instructions to the inverter device 15 to have the torque Tmt of the torque vectoring motor 2 increase or decrease. Then, the torque T21R of the right drive wheel 21R and the torque T21L of the left drive wheel 21L are changed to generate the motor torque (drive torque) difference between the motor torques inputted to the respective right and left drive wheels 21R and 21L. For example, if the rotational speed Nmt of the torque vectoring motor 2 becomes fast, the straight line L1 inclines such that the right side of the line L1 inclines upwardly. As a result, the rotational speed N21L of the left drive wheel 21L becomes slower and on the other hand, the rotational speed N21R of the right drive wheel 21R becomes faster.

It is noted that the control portion 17 controls the torque vectoring motor 2 not to generate the rotational speed difference between the right and left drive wheels 21R and 21L, i.e., not to incline the straight line L1 in FIG. 2 when the vehicle V is travelling straight forward. Thus, locking of the differential 13 can be performed.

(Torque Vectoring Device according to Second Embodiment)

Figure 3:
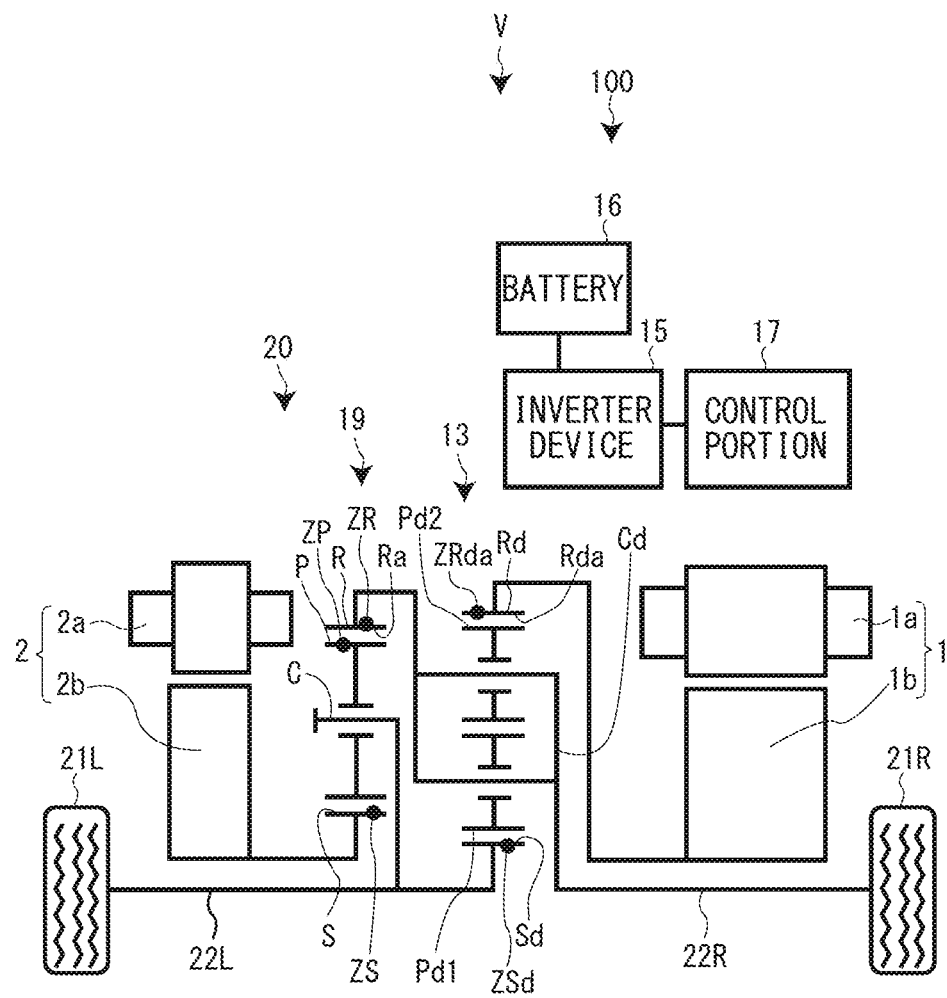
FIG. 3 is an explanatory schematic view of the drive device for a vehicle in which the torque vectoring device according to a second embodiment is installed.

The torque vectoring device 20 according to the second embodiment will be explained with reference to FIG. 3, particularly, the points which differ from the torque vectoring device 10 of the first embodiment will be explained. The torque vectoring device 20 according to the second embodiment includes a single pinion planetary gear mechanism 19, a differential 13 and a torque vectoring motor 2. The single pinion planetary gear mechanism 19 and the differential 13 are provided adjacently, and are arranged coaxially with each other in series in an axial direction.

The single pinion planetary gear mechanism 19 is formed by a sun gear S, a plurality of planetary gears P, a carrier C and a ring gear R. The sun gear S is connected to the torque vectoring rotor 2b of the torque vectoring motor 2. The plurality of planetary gears P is provided at the outer peripheral side of the sun gear S and is engaged with the sun gear S. The carrier C pivotally supports the plurality of planetary gears P. The ring gear R is provided at the outer peripheral side of the plurality of planetary gears P. The inner gear Ra which engages with the plurality of planetary gears P is formed at the inner periphery of the ring gear R.

The differential 13 is structured as same with the structure of the differential 13 of the torque vectoring device 10 according to the first embodiment. The differential carrier Cd and the ring gear R are mutually connected with each other. The differential sun gear Sd and the sun gear S are mutually connected with each other.

(Explanation of Speed Diagram of Torque Vectoring Device of Second Embodiment)

Next, the speed diagram of the torque vectoring device 20 according to the second embodiment will be explained with reference to FIG. 4. The vertical axis in FIG. 4 indicates the rotational speed of respective elements shown in FIG. 3. The area above the line zero (0) indicates the positive rotation direction. Signs and symbols in FIG. 4 represent the following:

ZS: number of teeth of sun gear S
ZR: number of teeth of inner gear Ra
ZSd: number of teeth of differential sun gear Sd
ZRda: number of teeth of differential inner gear Rda
N21L: rotational speed of left drive wheel 21L
N21R: rotational speed of right drive wheel 21R
Nmd: rotational speed of drive motor generator 1
Nmt: rotational speed of torque vectoring motor 2
T21L: torque of left drive wheel 21L
T21R: torque of right drive wheel 21R
Tmd: torque of drive motor generator 1
Tmt: torque of torque vectoring motor 2

Figure 4:
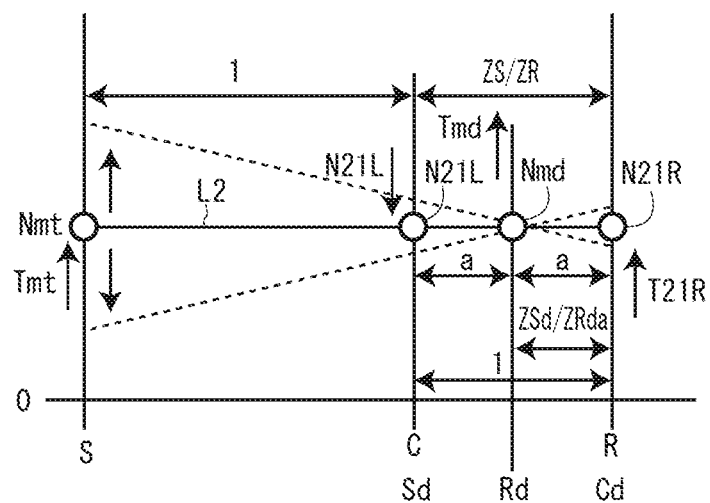
FIG. 4 is a speed diagram of the torque vectoring device according to the second embodiment of the invention.

In FIG. 4, the straight line L2 represents the relationship of rotational speed of the sun gear S, carrier C and the ring gear R and the relationship of rotational speed of the differential sun gear Sd, the differential ring gear Rd and the differential carrier Cd. In FIG. 4, the solid line represents the state that the vehicle V is travelling straight forward, and the broken lines represents the state that a rotational speed difference is generated between the right and left drive wheels 21R and 21L by the torque vectoring device 20.

The torque vectoring motor 2 rotates even under the state that the vehicle V is travelling straight forward. If a motor torque difference between the right drive wheel 21R and the left drive wheel 21L is required, the control portion 17 gives instructions to the inverter device 15 to have the torque Tmt of the torque vectoring motor 2 increase or decrease. Then, the inclination of the straight line L2 changes (See broken lines in FIG. 4) and the rotational speed N21L of the left drive wheel 21L and the rotational speed N21R of the right drive wheel 21R are changed.

(Advantageous Effects of the Embodiments)

By structuring the torque vectoring device 10 and 20 as explained, even under the state that the vehicle V is travelling straight forward as shown in FIGS. 2 and 4, torque vectoring motor 2 rotates. Accordingly, when the torque vectoring motor 2 is controlled such that the motor torques Tm outputted from the right and left drive wheels 21R and 21R from the drive motor generator 1 under the state that the vehicle V is travelling straight forward become equal to each other, the torque vectoring motor 2 is not rotated. Thus, flowing of the electric current only through the particular phase torque vectoring stator 2a among the torque vectoring stators 2a of the torque vectoring motor 2 can be prevented. As a result, the deterioration of the particular phase torque vectoring stator 2a can be prevented.

The torque vectoring device 10 according to the first embodiment includes a torque vectoring motor 2, a first sun gear S1, a plurality of first planetary gears P1 provided at an outer peripheral side of the first sun gear S1 and engaged therewith, a second sun gear S2 which gear diameter is larger than a gear diameter of the first sun gear S1, a plurality of second planetary gears P2 provided at an outer peripheral side of the second sun gear S2 and engaged therewith, the plurality of second planetary gears P2 being arranged coaxial with the plurality of first planetary gears P1 and formed integrally therewith, a common carrier Cc connected to the torque vectoring motor 2 and pivotally supporting the plurality of first planetary gears P1 and the plurality of second planetary gears P2, and a differential 13 which includes a differential ring gear Rd (input member) to which a motor torque Tm (drive torque) is inputted, a differential sun gear Sd (first output member) connected to the first sun gear S1 and at the same time connected to a left drive wheel 21L, and a differential carrier Cd (second output member) connected to the second sun gear S2 and at the same time connected to a right drive wheel 21R, wherein the differential 13 absorbs a rotational speed difference between the right drive wheel 21R and the left drive wheel 21L. By structuring a torque vectoring device as defined above, according to the torque vectoring device 10 of the first embodiment, in the speed diagram shown in FIG. 2, the distance between the vertical line which indicates the rotational speed Nmt of the torque vectoring motor 2 and the vertical line which indicates the rotational speed Nmd of the drive motor generator 1 becomes large. Therefore, the straight line L1 shown in FIG. 2 changes the inclination at the point of rotational speed Nmd of the drive motor generator 1 as a fulcrum point (See broken lines in FIG. 2). Thus, as the principle of leverage, the difference of the motor torques (drive torques) inputted to the right and left drive wheels 21R and 21L can be largely set.

The torque vectoring device 20 according to the second embodiment includes a torque vectoring motor 2, a sun gear S to which the torque vectoring motor 2 is connected, a plurality of planetary gears P provided at an outer peripheral side of the sun gear S and engaged therewith, a carrier C pivotally supporting the plurality of planetary gears P, a ring gear R provided at an outer peripheral side of the plurality of planetary gears P and engaged therewith, and a differential 13 which includes a ring gear R (an input member) to which a motor torque (drive torque) is inputted, a differential sun gear Sd (first output member) connected to the carrier C and at the same time connected to a left drive wheel 21L and a differential carrier Cd (second output member) to which the ring gear R is connected and at the same time connected to a right drive wheel 21R, wherein the differential 13 absorbs a rotational speed difference between the right and left drive wheels 21R and 21L. By structuring the torque vectoring device 20, as shown in FIG. 3, the torque vectoring device 20 is formed only by the single pinion planetary gear mechanism 19 other than the differential 13. Therefore, comparing the structure which is formed by a plurality of planetary gear mechanisms other than the differential 13, the size in the axial direction of the torque vectoring device 20 according to the second embodiment can be down-sized.

The differential 13 is a double pinion type planetary gear mechanism which includes a differential sun gear Sd, a plurality of first differential planetary gears Pd1 provided at an outer peripheral side of the differential sun gear Sd and engaged therewith, a plurality of second differential planetary gears Pd2 provided at an outer peripheral side of the plurality of first differential planetary gears Pd1 and engaged therewith, a differential carrier Cd which pivotally supports the plurality of first differential planetary gears Pd1 and the plurality of second differential planetary gears Pd2 and a differential ring gear Rd which is provided at an outer peripheral side of the plurality of second differential planetary gears Pd2 and engaged therewith. By structuring the differential 13 above, comparing the torque vectoring device having a differential with bevel gears, the size in the axial direction of the torque vectoring device 10 and 20 can be down-sized.

(Other Embodiments)

According to the embodiments explained above, the drive source which outputs the drive torque to the differential ring gear Rd of the differential 13 is the drive motor generator 1. However, an engine may be used as the drive source which outputs the drive torque to the differential ring gear Rd. Further, the drive motor generator 1 and the torque vectoring motor 2 have the electricity generation function (generator function), however, the motors without such generation function may be used, without any problems.

According to the embodiments explained above, the differential sun gear Sd is rotatably connected to one (the left drive wheel 21L) of the drive wheels 21R and 21L through the left drive axle 22L and the differential carrier Cd is rotatably connected to the other (the right drive wheel 21R) of the drive wheels 21R and 21L through the right drive axle 22R. However, the differential sun gear Sd is rotatably connected to one (the right drive wheel 21R) of the drive wheels 21R and 21L through the right drive axle 22R and the differential carrier Cd is rotatably connected to the other (the left drive wheel 21L) of the drive wheels 21R and 21L through the left drive axle 22L.

The differential 13 according to the embodiments explained above is a double pinion type planetary gear mechanism. However, a bevel gear wheels are used for the differential 13.

The invention claimed is:

1. A torque vectoring device comprising:
    a torque vectoring motor;
    a sun gear connected to the torque vectoring motor;
    a plurality of planetary gears provided at an outer peripheral side of the sun gear and engaged therewith;
    a carrier which pivotally supports the plurality of planetary gears;
    a ring gear provided at an outer peripheral side of the plurality of planetary gears and engaged therewith; and
    a differential which includes an input member to which a drive torque is inputted, a first output member to which the carrier is connected and at the same time connected to one of a right drive wheel and a left drive wheel, a second output member to which the ring gear is connected and at the same time connected to the other of the right drive wheel and the left drive wheel, wherein the differential absorbs a rotational speed difference between the right drive wheel and the left drive wheel.

2. The torque vectoring device according to claim 1, wherein
    the differential comprising a double pinion planetary gear mechanism which includes:
    a differential sun gear;
    a plurality of first differential planetary gears provided at an outer peripheral side of the differential sun gear and engaged therewith;
    a plurality of second differential planetary gears provided at an outer peripheral side of the plurality of first differential planetary gears and engaged therewith;
    a differential carrier which pivotally supports the plurality of first differential planetary gears and the plurality of second differential planetary gears; and
    a differential ring gear provided at an outer peripheral side of the second differential planetary gears and engaged therewith; wherein
    the input member includes the differential ring gear;
    the first output member includes the differential sun gear; and
    the second output member includes the differential carrier.

* * * * *